(12) United States Patent
Strandberg

(10) Patent No.: US 9,055,140 B2
(45) Date of Patent: Jun. 9, 2015

(54) CONTACT CENTER QUEUE PRIORITY MANAGEMENT METHOD AND SYSTEM

(75) Inventor: Malcom Strandberg, Cambridge, MA (US)

(73) Assignee: Aspect Software, Inc., Chelmsford, MA (US)

( * ) Notice: Subject to any disclaimer, the term of this patent is extended or adjusted under 35 U.S.C. 154(b) by 29 days.

(21) Appl. No.: 13/550,066

(22) Filed: Jul. 16, 2012

(65) Prior Publication Data

US 2014/0016766 A1 Jan. 16, 2014

(51) Int. Cl.
*H04M 3/00* (2006.01)
*H04M 3/428* (2006.01)
*H04M 3/523* (2006.01)

(52) U.S. Cl.
CPC ............... *H04M 3/00* (2013.01); *H04M 3/428* (2013.01); *H04M 3/523* (2013.01); *H04M 2201/16* (2013.01)

(58) Field of Classification Search
CPC ............ H04M 3/5191; H04M 3/5183; H04M 3/5175; H04M 3/523; H04M 3/5232; H04M 3/5233
USPC ............. 379/265.01–265.02, 265.09, 266.01, 379/265.14
See application file for complete search history.

(56) References Cited

U.S. PATENT DOCUMENTS

| | | | |
|---|---|---|---|
| 5,555,179 A | 9/1996 | Koyama | 700/95 |
| 5,765,033 A | 6/1998 | Miloslavsky | 709/206 |
| 5,926,539 A | 7/1999 | Shtivelman | 379/266.01 |
| 5,946,387 A | 8/1999 | Miloslavsky | 379/265.12 |
| 5,953,332 A | 9/1999 | Miloslavsky | 370/352 |
| 5,953,405 A | 9/1999 | Miloslavsky | 379/265.01 |
| 6,002,760 A | 12/1999 | Gisby | 379/266.01 |
| 6,021,428 A | 2/2000 | Miloslavsky | 709/206 |
| 6,044,145 A | 3/2000 | Kelly et al. | 379/265.02 |
| 6,044,368 A | 3/2000 | Powers | 707/2 |
| 6,067,357 A | 5/2000 | Kishinsky et al. | 379/265.02 |
| 6,108,711 A | 8/2000 | Beck et al. | 709/242 |
| 6,138,139 A | 10/2000 | Beck et al. | 709/202 |
| 6,167,395 A | 12/2000 | Beck et al. | 707/3 |
| 6,170,011 B1 | 1/2001 | Macleod Beck et al. | 709/224 |
| 6,175,563 B1 | 1/2001 | Miloslavsky | 370/352 |
| 6,175,564 B1 | 1/2001 | Miloslavsky | 370/352 |
| 6,185,292 B1 | 2/2001 | Miloslavsky | 379/265.01 |
| 6,259,786 B1 | 7/2001 | Gisby | 379/266 |
| 6,263,066 B1 | 7/2001 | Shtivelman et al. | 379/266 |
| 6,295,551 B1 | 9/2001 | Roberts et al. | 709/205 |
| 6,345,305 B1 | 2/2002 | Beck et al. | 709/242 |
| 6,373,836 B1 | 4/2002 | Deryugin et al. | 370/352 |

(Continued)

*Primary Examiner* — Rasha Al Aubaidi

(57) ABSTRACT

A system and method for providing hold queue prioritizing for a contact center includes an automated system and a contact receiver/director for connecting contacts to the automated system. A contact identifier obtains identifying information from each of the contacts connected to the system. A hold queue is coupled to the contact receiver/director for storing contact records associated with contacts connected to the automated system. A contact status identifier determines a connection status of each of the contacts in the hold queue and stores the connection status in the respective contact record for each contact. A contact-back identifier identifies a received contact-back by matching the contact identifying information associated with a contact to a contact record in the hold queue. The contact receiver/director selects a contact record with a "connected" connection status and connects the caller in the hold queue associated with the selected contact record to an available agent.

18 Claims, 5 Drawing Sheets

(56) References Cited

U.S. PATENT DOCUMENTS

| | | |
|---|---|---|
| 6,389,007 B1 | 5/2002 | Shenkman et al. ........... 370/352 |
| 6,393,015 B1 | 5/2002 | Shtivelman ................... 370/352 |
| 6,732,156 B2 | 5/2004 | Miloslavsky ................. 709/206 |
| 2008/0175374 A1* | 7/2008 | Lauridsen et al. ......... 379/266.1 |

* cited by examiner

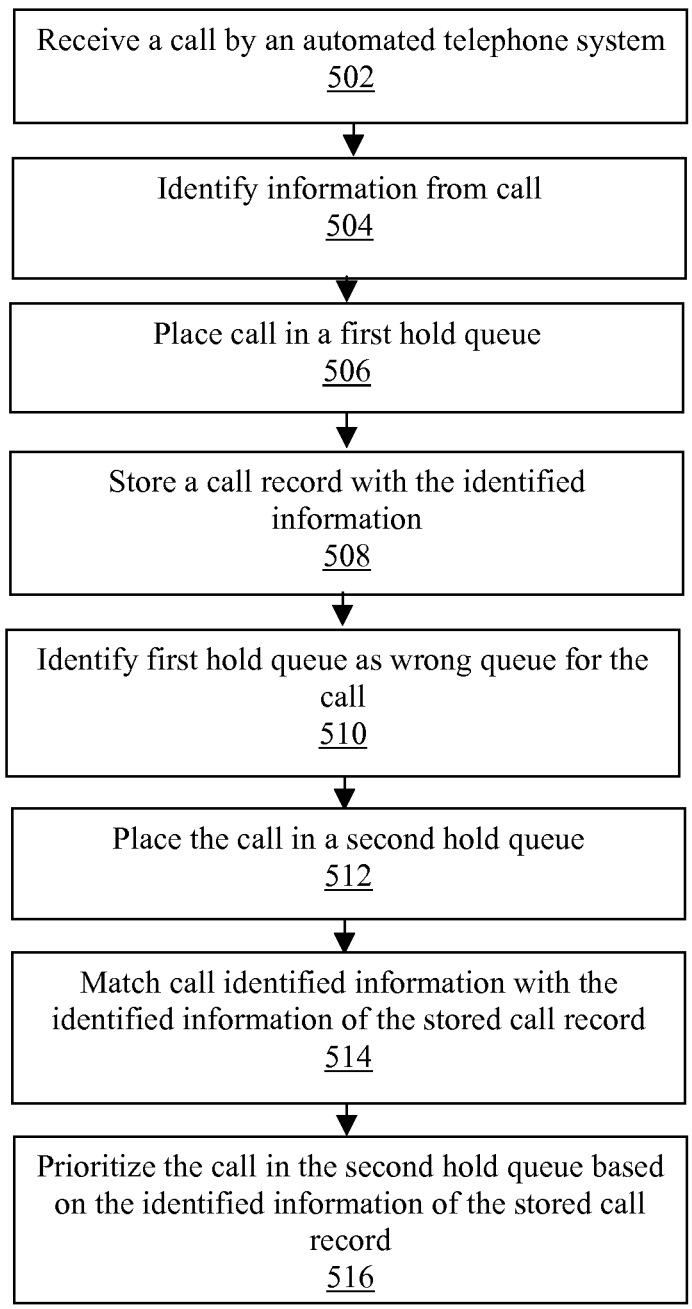

CONTACT CENTER QUEUE PRIORITY MANAGEMENT METHOD AND SYSTEM

TECHNICAL FIELD

The present invention relates to contact center queue priority and more particularly, relates to a system and method for maintaining priority of previously disconnected contacts in a contact center queue once the contact re-contacts the contact center.

BACKGROUND INFORMATION

Contact centers are widely used by companies and service organizations to allow a user to purchase and/or obtain customer support for products and services. Agents staff the contact center and provide sales or support information on various products and services. A user may make a communication to the contact center through a variety of modes of communication; for example, the user may make a telephone call or send an email to the contact center or connect on line when on a company's web site. An automated system of the contact center receives the in-bound communication or contact and routes the communication or contact to an agent. The contact center may also initiate outbound communications or contacts to a user.

For example, the contact center may contact a user via an outbound communication and then contact an available agent when the user responds to the communication, thereby creating a connection between the agent and the user.

Contact centers are under pressure to minimize costs and time on hold by users while providing answers to users' questions in a convenient manner. In addition, contact centers do not receive user requests for information in regular intervals. During peak periods of user requests, the contact center may have to place the user on hold in a queue of the contact center until an agent currently handling other requests is available to respond to the user on hold. During periods of reduced user requests, the contact center must deal with the increased cost of agents sitting idle. The contact centers have to balance the cost of overstaffing with the reduced convenience to users that must be placed on hold.

To help alleviate the irregular patterns of user requests, contact centers have provided users with information associated with the current wait time of user requests waiting in a queue of the contact center. Contact centers have also recorded user information and placed a call back to the user by the agent when an agent is available. However, this method does not always successfully re-contact a user, who may have moved to a different location with a different telephone number or method of communication.

As an example, a user may contact a contact center from their home telephone number and receive a message about excessive wait time. Later that day, the user may call back from their cell phone or work phone or via another method of communication, such as text message or e-mail. Contact centers currently cannot link or create an association between these two contacts together.

Based on the foregoing, it is apparent that there is a need for a system and method to provide a user with the ability to re-contact the contact center via a second or subsequent communication means or method as described below, which enables the user to regain their original position in the hold queue. The re-contact can be made by any method, including but not limited to telephone, e-mail, Instant Message (IM), Text Message (TM), Short Message Service (SMS) or SMS voice. Also it is apparent there is a need for a method and system that determines the user's status in the queue and provides the user with the option of providing a communications connection with an agent, regardless of the type of communication employed by the user.

Additionally, it is common that a user is placed in the wrong queue initially and after the determination is made that the user is in the wrong queue, the user is transferred to a second queue. If all agents are busy in the second queue, then the hold time for the second queue commences. A user would be stuck waiting in a first queue and a second queue, thereby incurring two separate wait times. Additionally, the user who is placed into a second queue must start the on hold process all over again once placed in the correct hold queue. Therefore there is a need for the contact center system to identify the first hold time in the first queue and link the user's place in the first hold queue with the second hold queue, in order to be able to advance or compensate the user once positioned in the second queue.

SUMMARY

The present invention is a hold queue prioritizing system for a contact center comprising an automated contact center system; a contact receiver/director, responsive to at least one incoming contact request via a first contact method, for connecting said at least one contact to the automated contact center system; a contact identifier, for obtaining unique contact identifying information from each of the at least one contacts; a hold queue, coupled to the contact receiver/director, for storing contact records associated with the at least one contacts; a contact status identifier stored in the respective contact record, wherein the contact status identifier indicates a connection status of each at least one contact associated with each contact record in the hold queue; and a contact-back identifier, responsive to said contact receiver/director which in turn is responsive to said least one incoming re-contact request received from said at least one contact by means of a second contact method different from said first contact method, for identifying a received contact-back based on matching the received re-contact request from said at least one contact identifying information with a contact record in the hold queue, wherein a match between the received contact and the contact record in the hold queue changes the connection status of the contact record in the hold queue from a previous connection status to a connected status.

The hold queue prioritizing system may further comprise a contact record display accessible to each contacting user of the one or more contacts, for displaying contact user identifying information and contact prioritizing information for at least the contact user record of the contacting user's contact in the hold queue. A contact may be able to monitor the contact record display via the Internet.

The system may further comprise a disconnected contact record queue, coupled to the contact receiver/director and to the hold queue, the disconnected contact record queue holding contact records associated with a disconnected contact status identifier. The contact receiver/director may prioritizes the contact records in the disconnected contact record queue by prioritizing the received contact-back associated with the contact record over any contact records not associated with the received contact-back record. A user with a disconnected contact record may contact-back, causing re-connection of the contact record, and wherein the user regains priority in the hold queue.

In another embodiment of the present invention a hold queue prioritizing method for use in a contact center comprises the acts of: receiving a plurality of contacts by an automated system; identifying information from the contacts connected to the automated system, wherein said identified information includes a media type used by any given user to contact the contact center; placing each of the plurality of contacts in a hold queue coupled to the automated system; identifying a connection status of each of the plurality of contacts in the hold queue; storing a contact record with the identified information and the connection status for each of the plurality of contacts; and identifying a received contact-back communication from a user based on a match between the user's received callback communication identified information and the identified information in a stored contact record for said user, and wherein the contact-back from a given user is effected by a different media type than the media type used by the user in the stored contact record.

The method may further comprise the acts of: connecting one or more contact center agent terminals to said automated system for handling said connected contacts; selecting a contact record for connection to one of the one or more contact center agent terminals; and connecting the contact in the hold queue associated with the selected contact record to one of the one or more contact center agent terminals. The method may also further comprise the act of: storing the contact record with a disconnected contact status in a disconnected queue.

The method may also further comprise the acts of identifying at least one of the plurality of contacts as being in an incorrect hold queue; removing the contact from the incorrect hold queue; placing the contact in a second hold queue; and prioritizing the contact in the second hold queue based on the identified information of the stored contact record and a predetermined priority method. An additional act of the method may comprise moving re-connected contacts in the disconnected queue into the hold queue; and prioritizing contact records in the hold queue based on the earliest connected contact. In this method, the received contact-back may be from a different telephone number than a telephone number used in the originally stored contact record.

In a further embodiment of the present invention, a computer program product is provided for prioritizing a hold queue in a contact center, tangibly embodied in an information carrier, for assigning a process to a processor for execution, the computer program product being operable to cause a machine to receive a plurality of contacts by an automated system; identify information from each of the plurality of calls connected to the automated system; place each of the plurality of calls in at least a first hold queue coupled to the automated system; identify a connection status of each of the plurality of calls in the at least a first hold queue; store a call record with the identified information and the connection status for each of the plurality of calls; receive a re-contact by the automated system; compare the re-contact with the plurality of contacts in the hold queue; and match the re-contact with the identified information of a stored contact record.

In this embodiment, the computer program product may further display and prioritize the plurality of contact records located in the hold queue using a predetermined priority method.

In this embodiment, the computer program product may connect one or more contact center agent terminals to the automated system for handling the connected contacts; select a contact record using the predetermined priority method for connection to one of the one or more contact center agent terminals; and connect the contact in the hold queue associated with the selected contact record to one of the one or more contact center agent terminals.

Additionally, the computer program product may store a contact record in a disconnected queue when the selected contact record is associated with a contact record that has a disconnected connection status. In this embodiment, the computer program product may identify the connection status of each of the plurality of contacts as having a status of either connected or disconnected; regularly review the status of each of the plurality of contacts; maintain connected contacts in the hold queue and disconnected contacts in the disconnected queue; and prioritize the contact records in the hold queue and the disconnected queue based on the predetermined priority method. The re-contact may be from a second telephone number than the stored contact, which is from a first telephone number.

It is important to note that the present invention is not intended to be limited to a system or method which must satisfy one or more of any stated objects or features of the invention. It is also important to note that the present invention is not limited to the exemplary or primary embodiments described herein. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings wherein:

FIG. 5 is a flow chart illustrating an exemplary embodiment of a queue-prioritizing method according to the present invention.

DETAILED DESCRIPTION

Figure 1:
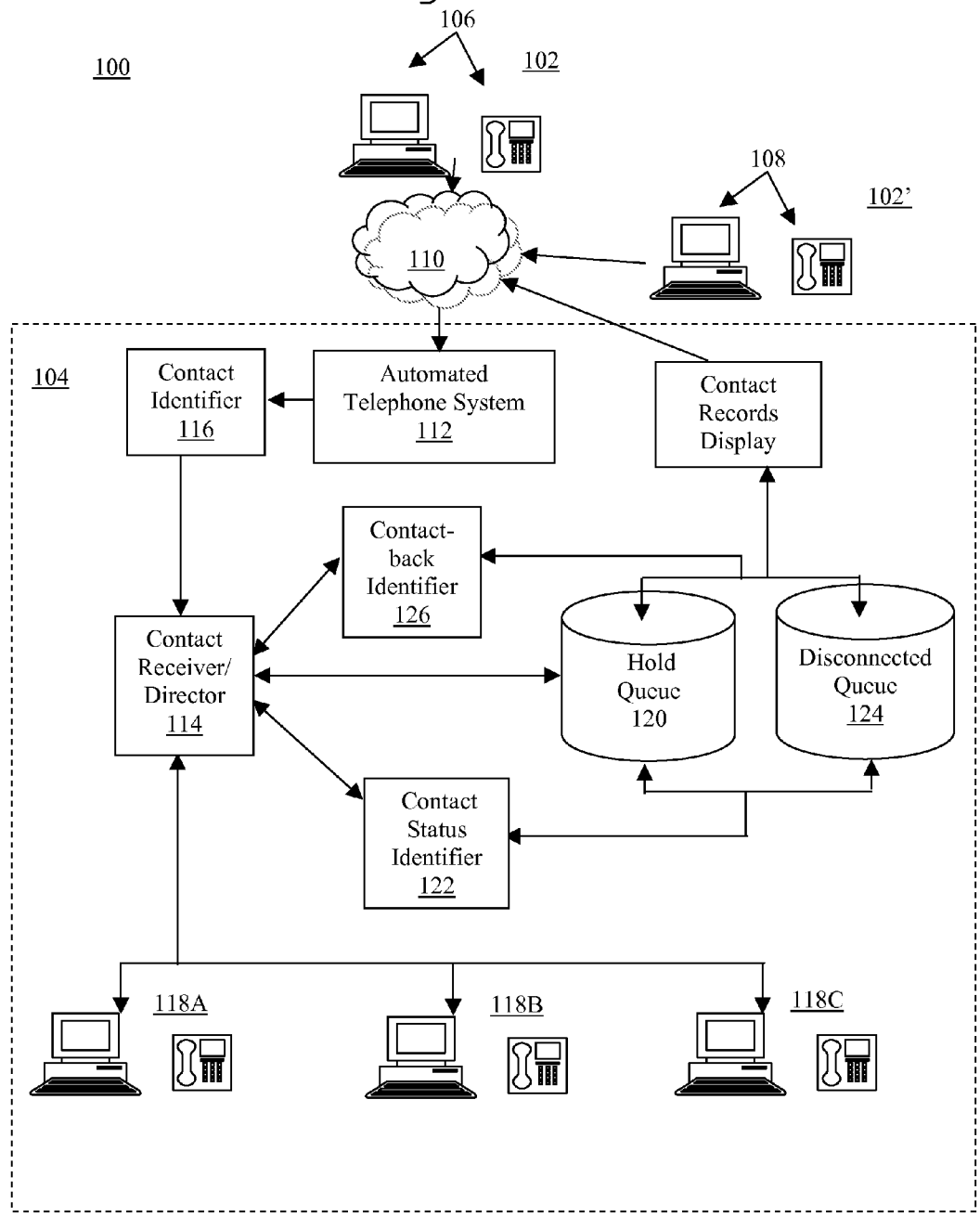
FIG. 1 is a system diagram of an exemplary contact center used to implement a queue-prioritizing system according to an exemplary embodiment of the present invention.

The system and method of queue prioritizing 100, as illustrated in FIG. 1, allows a user to contact a contact center 104 from a first location 102 and move to a second location 102' while maintaining the user's position in call priority. The user may contact the contact center 102 using a first manner of communication equipment 106 and move to a second location 102' using a second manner of communication equipment 108. For example, the first and second manner of communication can be email, web chat, IM, SMS, video, SMS voice, video phone, or another communication manner. The first location 102 and the second location 102' can use any manner of communication (106 or 108) as described below. The manner of communication of the first location 102 and the second location 102' may be the same but are preferably different.

For example, the first location 102 may be a person's home using a first manner of communication, such as a home phone. The second location 102' may be at the user's work place using a second manner of communication 108, such as a work phone. Alternatively the second location 102' may be the person's home with the second manner or communications 108 being email. All of this may be done while maintaining the user's priority position to be connected to an agent of the contact center. The communication equipment is illustrated as being connected with networks 110. It will be apparent to an individual skilled in the art that networks 110 may represent a variety of physical networks and various communication protocols.

In a first example, the user's contact (telephone call or other means of contact) is received by an automated system 112. The user is then identified by a contact identifier 116 while or before the contact is received and routed by the contact receiver/director. The contact identifier 116, which may be a hardware solution, a software solution or combination hardware/software solution, gathers information regarding the contact with or without the user's knowledge in order to create a contact record for the contact (user).

For example, the contact identifier 116 may use automated number identification (ANI) from a telephone call to gather the user's telephone number, or may prompt the caller to enter a telephone, account number or other identifying information or a combination of these that will allow the system to identify the user. Once the contact identifier 116 gathers the information used to initially identify this contact, the contact is compared with contacts in a hold queue or disconnected queue in order to determine if the contact is associated with a prior contact. If the contact is not associated with a prior contact, the contact identifier information is saved in the event the information may be used at a later point in time to identify an attempt to reconnect or call back by the contact. The information is saved in the form of a contact record that is unique to the particular user. The contact identifier 116 is not limited to examining telephone calls and may examine other forms of communication, for example, emails, SMS messages or web chat sessions. The contact identifier 116 may scan text or other communication identifiers to gather the information necessary to form a contact record.

The automated system 112 connects the contact to a contact receiver/director 114. The contact receiver/director 114 attempts to route the contact received by the contact center 104 to an available agent 118A-C. If an agent 118 is available the contact receiver/director 114 routes the contact to the available agent 118. If no agent is available, the contact receiver/director stores the contact in a hold queue 120 until an agent 118 is available to handle the contact. The hold queue 120 stores a contact record associated with the contact. The contact record stores the information gathered by the contact identifier 116. The hold queue 120 may be a First In First Out (FIFO) priority wherein the first contact in the queue or earliest contact received is the first to be connected to an agent 118 when an agent 118 becomes available. Other priority methods may be used as will be discussed later herein and well known in the art.

A contact status identifier 122 is used to monitor the status of calls stored in the queue. The contact initially begins with a status of "connected". While the contact is waiting in the hold queue 120, the user may be prompted with the option to disconnect and reconnect at some point later in time. The user would continue to maintain their position in the hold queue 120 even after the user disconnects. The user may be given an option to provide identifying information for later use when the user reconnects. For example, the user may provide or be given a pass code. Other means of identifying the contact are also within the scope of the current invention. Once the user disconnects; the contact status identifier 122 recognizes or is notified of the disconnection. The contact status identifier 122 updates the contact record associated with the call to reflect that the contact has been disconnected.

The contact record may be placed in a disconnected queue 124 and given a different priority immediately or after a specified period of time. For example, the user may have been prompted to contact back in fifteen minutes. When the user re-contacts after fifteen minutes the reconnected contact may be given priority over all currently received contacts. In another example, the contact may stay in the hold queue 120 and maintain a FIFO priority with the other users in the contact center. It will be apparent to one skilled in the art that although the queues 120 and 124 are illustrated as separate queues the embodiments may be carried out using a single vital queue or using three or more queues to provide the user with additional priority options.

When the user attempts to reconnect or re-contact the contact center from, for example, a second location 102', the contact identifier 116 gathers information about the reconnected contact. The information gathered by the contact identifier 116 is used by a contact-back identifier 126 to associate the reconnected contact with a contact record in the hold queue 120 or disconnected queue 124. For example, the contact-back identifier 126 may identify an email or web address of the email/web chat with a prior phone number from a previous call. Once the reconnected contact is associated with the (initial) contact record, the contact returns to the priority in the hold queue 120 as if the contact had never disconnected. The contact status identifier 122 recognizes or is notified of the reconnection of the contact and updates the contact record status to "connected". If the contact is the highest priority in the hold queue 120, the contact receiver/director 114 connects the reconnected contact to the next available agent 118.

In another exemplary embodiment, a contact records display 128 gathers the status of the contact records in the hold queue 120 or disconnected queue 124. The contact records display 128 may be accessed by the user over the Internet. The user may log on to a website and enter information to identify the contact record associated with the user. The contact record display may gather information about the status of the contact record and display the information to the user. For example, the contact records display 128 may provide a continually updated time frame for when the contact is to be answered. This may serve to alert the user of when to attempt to re-contact the contact center. The user may be offered the opportunity to be contacted back by an agent or to contact back themselves and return to their position in the queue. These and other features may be offered to the user without departing from the scope of the invention.

Figure 2:
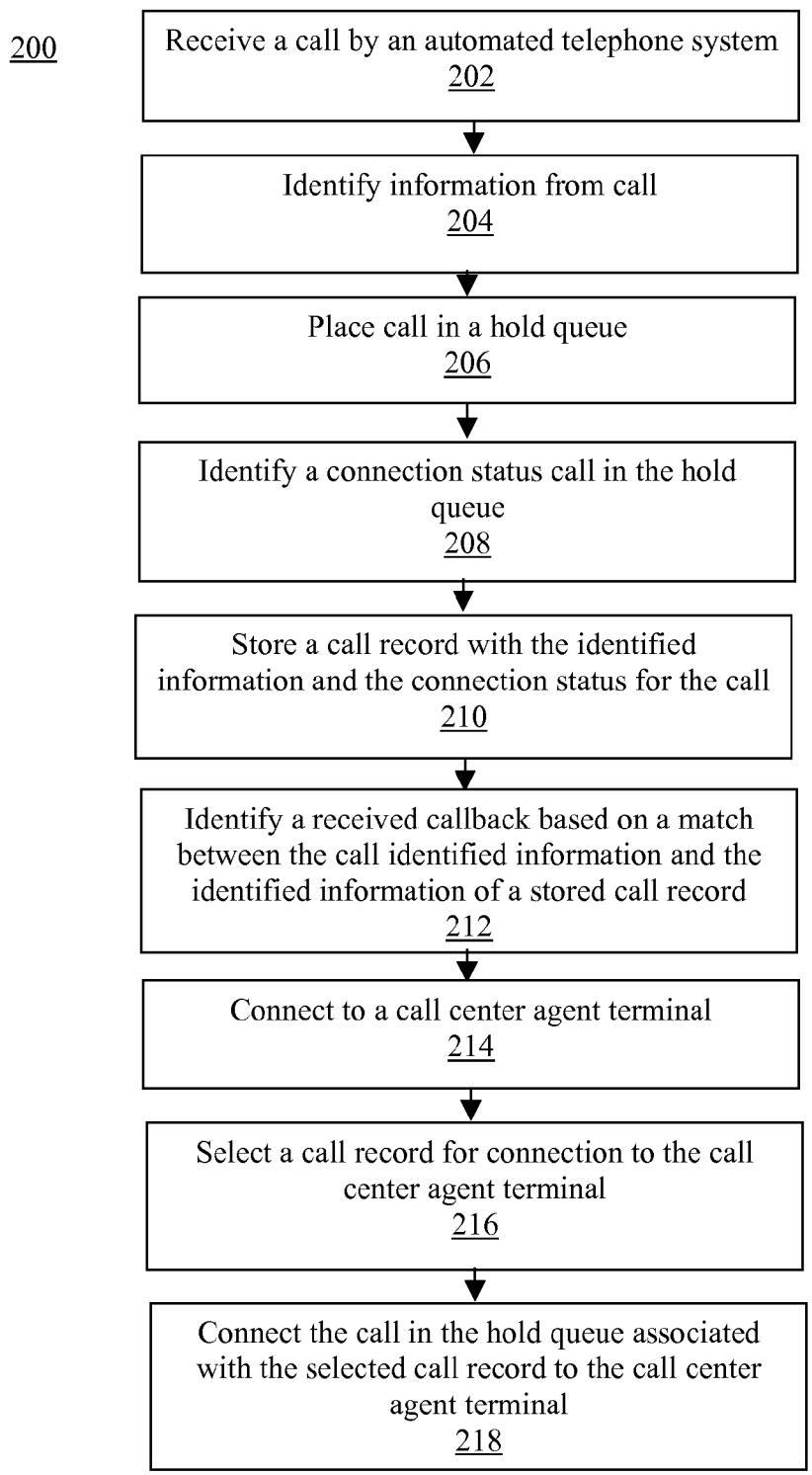
FIG. 2 is a flow chart illustrating an exemplary embodiment of a queue-prioritizing method according to the present invention.

Referring to FIG. 2, a second exemplary embodiment of a queue-prioritizing method 200 is illustrated. The automated telephone system 112 receives a call from the user (block 202). The call identifier 116 gathers information about the call (block 204). The call is placed in the hold queue 120 if no agent 118 is available to handle the call (block 206). The call status identifier 122 identifies the call status in a call record (block 208) as either 'connected' or 'disconnected'. A call record is stored for the call with the identified information and the current connection status (block 210). The callback identifier 126 continually determines if an incoming call is associated with a user reconnecting (block 212) and if so places the user back in position in the hold queue as if the user had never disconnected. Once an agent becomes available the agent terminal is connected to the call receiver/director 114 (block 214). The call receiver/director 114 selects a call record for connection to the agent terminal (block 216). The call receiver/director 114 connects the call associated with the call record to the agent's terminal (block 218). The agent provides the user with the desired services. Since the call record has had its order restored in the hold queue, the caller does not have to wait in the hold queue all over again.

Figure 3:
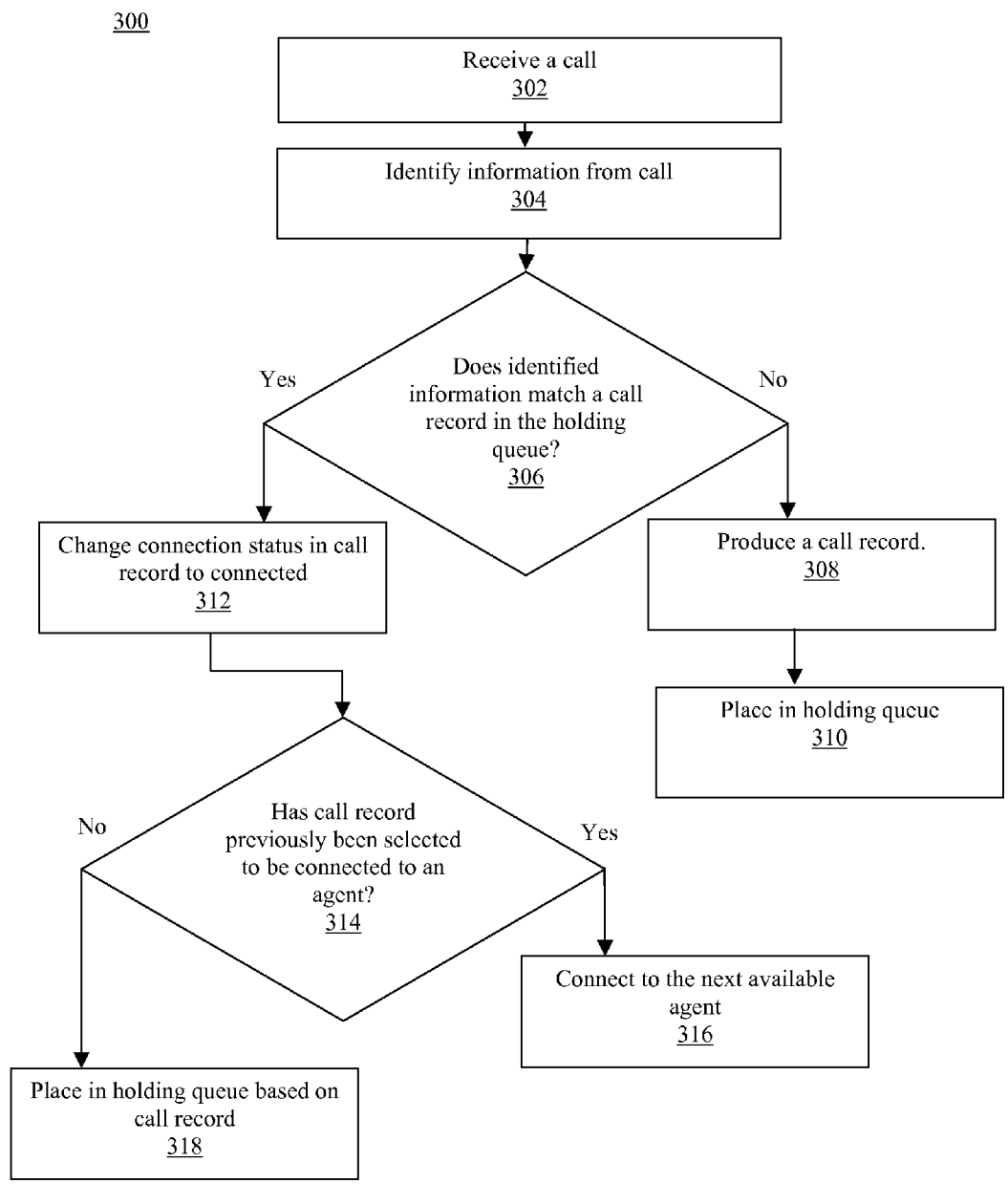
FIG. 3 is a flow chart illustrating an exemplary embodiment of a queue-prioritizing method handling a received call according to the present invention.

Referring to FIG. 3, a third exemplary embodiment of the queue-prioritizing method of handling a received call is illustrated. The call is received by the automated telephone system 112 (block 302). The call identifier 116 gathers information about the call (block 304). As previously discussed the call identifier 116 may use a variety of techniques to gather the information. For example, the user may be prompted to enter a touch-tone return code if the user is attempting to reconnect with an associated call record. The callback identifier 126 may use the callback code to identify a call record in the hold queue 120 (block 306). If there is no call record, for example the user does not enter a callback code ("No" branch of block 306), a call record is then produced with the user's information (block 308). The call is placed in the hold queue 120 until the call can be answered by an agent (block 310).

If a call record in the holding queue is associated with the call, for example the user enters a callback code that is matched to a call record in the holding queue ("Yes" branch of block 306), the call record from the holding queue is updated with the connected connection status (block 312). The call receiver/director determines if the call record has previously been selected to be answered by an agent (block 314). If the call record has already been selected to be answered but was not answered by an agent due to a disconnected connection status ("Yes" branch of block 314), the call is answered by the next available agent (block 316). If the call has not been selected to be answered ("No" branch of block 318), the call is placed in the hold queue 120 and answered in the order of the original call record. The method provides the user with the ability to call back and regain their priority in the queue.

Figure 4:
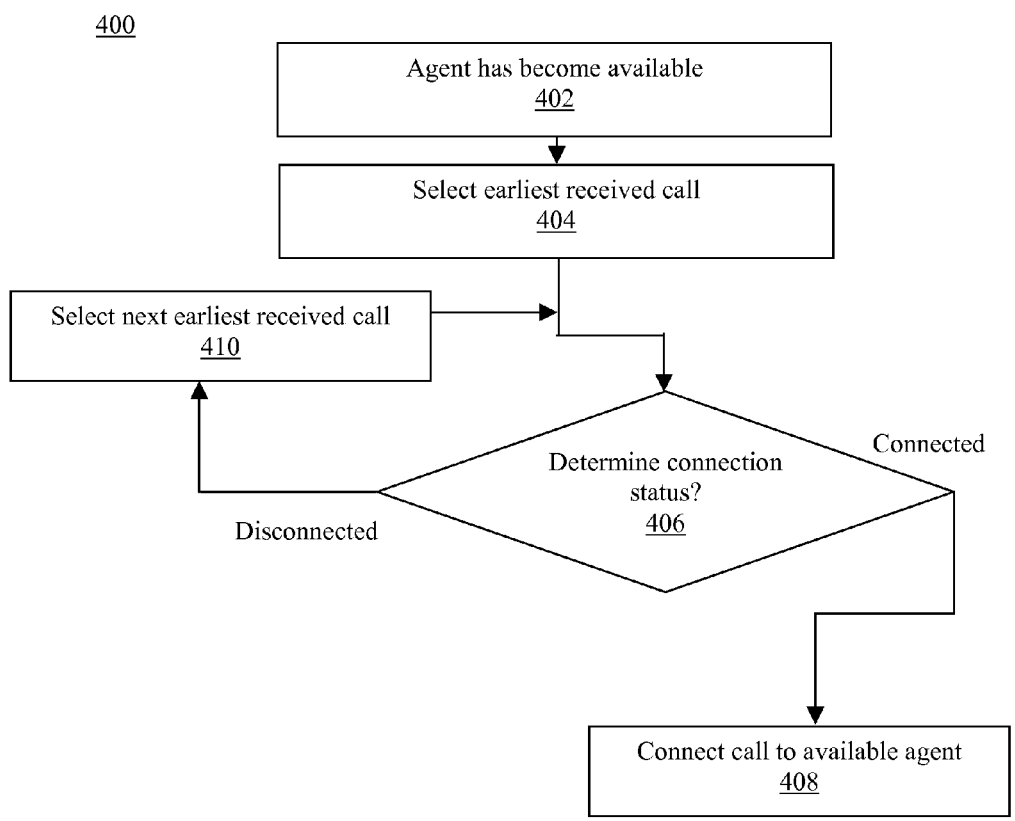
FIG. 4 is a flow chart illustrating an exemplary embodiment of a queue-prioritizing method selecting a call from the hold queue according to the present invention.

Referring to FIG. 4, a fourth exemplary embodiment of the queue-prioritizing method of selecting a call from the hold queue is illustrated. The call receiver/director 114 is notified that an agent 118 has become available to receive a call (block 402). The call receiver/director 114 selects the call record in the hold queue that is the next call to be answered based on the priority system (block 404). For example, if the priority system is that the earliest received call is the highest priority call to be answered, then the earliest received call is selected from the hold queue 120. The call receiver/director 114 determines the connection status of the call record selected (block 406). If the call connection status is connected ("Connected" branch of block 406), the call associated with the call record is connected to the available agent (block 408). If the call connection status is disconnected ("Disconnected" branch of block 406), the call receiver/director 114 selects the next earliest call record in the hold queue 120 (block 410) and advances back to block 406. The disconnected call record may also be placed in the disconnected queue 124 according to another exemplary embodiment. In yet another exemplary embodiment a call with the call connection status of disconnected is handled by the call receiver/director 114, wherein the call receiver/director will place a call to the user in an attempt to establish a reconnection.

Referring to FIG. 5, a fifth exemplary embodiment of a queue-prioritizing method 500 is illustrated. The automated telephone system 112 receives a call from the user (block 502). The call identifier 116 gathers information about the call (block 504). The call is placed in a first hold queue 120 if no agent 118 is available to handle the call (block 506). The call status identifier 122 identifies the call status as connected and in the first queue in a call record. The call record is stored for the call with the identified information and the current connection status (block 508). The call center identifies the first hold queue as the incorrect queue for the call (block 510). An incorrect queue placement may occur as a result of the call being connected to an agent and after conversing with the caller determining the caller should be connected with another group of agents. Alternatively, an incorrect queue may occur when the caller's response to automated questions alerts the call center. Other methods of determining an incorrect queue are within the scope of the current invention. Upon a finding of an incorrect queue the call receiver/director 114 places the call into a second hold queue (block 512). The call receiver/director 114 matches call identified information of the call with the identified information of the stored call record (block 514). The call receiver/director 114 prioritizes the call in the second hold queue based on the identified information of the stored call record (block 516). This embodiment is used to allow a caller that is in the wrong queue to move up (or retain) priority in the second queue instead of starting from the beginning. The call receiver/director 114 connects the call associated with the call record to the agent's terminal, which may be within the same period of time as if the call had initially been placed in the correct queue. It is within the scope of the current invention that a caller could be moved between two or more queues when the caller has multiple issues or when incorrect queue placements are made.

The exemplary embodiments, described herein, illustrate the system and method in applications involving the processing of incoming communications in an exemplary communication center. However, the systems and methods are not limited to use with any particular type of communication center or communication processing application. The invention is applicable to the processing of incoming communications and outgoing communications. The exemplary embodiment may be used in, for example, but not limited to, automatic call distribution (ACD) systems, private branch exchange (PBX) systems, computer telephony systems, telemarketing systems, communication management systems or a combination of these systems. The term "call" as used herein may be a variety of types of communications; including, but not limited to telephone calls, e-mails, text message, instant message, short message service, etc.

Modifications and substitutions by one of ordinary skill in the art are considered to be within the scope of the present invention, which is not to be limited except by the allowed claims and their legal equivalents.

The invention claimed is:

1. A hold queue prioritizing system for a contact center comprising:
   an automated contact center system;
   a contact receiver/director, responsive to at least one incoming contact request via a first contact method, for connecting said at least one contact to the automated contact center system;
   a contact identifier, for obtaining unique contact identifying information from each of the at least one contacts connected to the automated contact center system;
   a hold queue, coupled to the contact receiver/director, for storing a contact record associated with each of the at least one contacts;
   a disconnected contact record queue, coupled to at least the contact receiver/director, the disconnected contact record queue configured for storing contact records associated with a disconnected contact status identifier;
   a contact status identifier, stored in the respective contact record of the at least one contact, wherein the contact status identifier indicates a connection status of each at least one contact associated with each contact record in the hold queue and the disconnected contact record queue; and a contact-back identifier, responsive to said contact receiver/director which in turn is responsive to least one incoming re-contact request received from said at least one contact by means of a second contact method different from said first contact method, for identifying a received contact-back based on matching the received re-contact request from said at least one contact identifying information with a contact record in one of the hold queue and the disconnected contact record queue, wherein a match between the received contact and the contact record in one of the hold queue and the disconnected contact record queue changes the connection status of the contact record in the hold queue from a previous connection status to a connected status, and wherein the contact receiver/director is configured for re-prioritizing the contact record associated with the re-contacting user in the disconnected contact record queue by prioritizing the received contact-back associated with the contact record with a higher priority level over any contact records not associated with the received contact-back record such that the received contact-back associated with the contact record is advanced in turn in said disconnected contact record queue.

2. The hold queue prioritizing system of claim 1, further comprising a contact record display accessible to each contacting user of the one or more contacts, for displaying contact user identifying information and contact prioritizing information for at least the contact user record of the contacting user's contact in the hold queue.

3. The hold queue prioritizing system of claim 2, wherein a contact can monitor the contact record display via the Internet.

4. The hold queue prioritizing system of claim 1, wherein a user with a disconnected contact record may contact-back, causing re-connection of the contact record, and wherein the user regains priority in the hold queue.

5. A hold queue prioritizing method for use in a contact center, said method comprising the acts of:

receiving a plurality of contacts by an automated system;

obtaining identifying information from the plurality of contacts connected to the automated system, wherein said identifying information includes a media type used by any given user to contact the contact center;

placing each of the plurality of contacts in one of a hold queue or a disconnected contact record queue coupled to the automated system;

identifying a connection status of each of the plurality of contacts in the hold queue;

storing a contact record with the identified information and the connection status for each of the plurality of contacts; and identifying a received contact-back communication from a user, wherein a match between the received contact and the contact record in one of the hold queue and the disconnected contact record queue changes the connection status of the contact record in the hold queue from a previous connection status to a connected status, and wherein the method next re-prioritizes the contact record associated with the re-contacting user in the disconnected contact record queue by prioritizing the received contact-back associated with the contact record with a higher priority level over any contact records not associated with the received contact-back record such that the received contact-back associated with the contact record is advanced in turn in said disconnected contact record queue.

6. The hold queue prioritizing method of claim 5, further comprising the acts of:

connecting one or more contact center agent terminals to said automated system for handling said connected contacts;

selecting a contact record for connection to one of the one or more contact center agent terminals; and connecting the contact in one of the hold queue or the disconnected contact record queue associated with the selected contact record to one of the one or more contact center agent terminals.

7. The hold queue prioritizing method of claim 5, further comprising the act of:

storing the contact record with a disconnected contact status in said disconnected contact record queue.

8. The hold queue prioritizing method of claim 5, further comprising the acts of:

identifying at least one of the plurality of contacts as being in an incorrect hold queue;

removing the contact from the incorrect hold queue;

placing the contact in a second hold queue; and prioritizing the contact in the second hold queue based on the identified information of the stored contact record and a predetermined priority method.

9. The hold queue prioritizing method of claim 8, further comprising the acts of:

moving re-connected contacts in the disconnected queue into the hold queue; and prioritizing contact records in the hold queue based on the earliest connected contact.

10. The hold queue prioritizing method of claim 5, wherein the received contact-back is from a different telephone number than a telephone number used in the originally stored contact record.

11. A computer program product for prioritizing a hold queue in a contact center, said computer program product tangibly embodied in an information carrier, for assigning a process to a processor for execution, the computer program product being operable to cause an automated, computer controlled contact center system responsive to at least one incoming contact request via a first contact method, for connecting said at least one incoming contact request to the automated contact center system to:

receive a plurality of contacts by said automated, computer controlled contact center system;

identify information from each of the plurality of contacts connected to the automated, computer controlled contact center system;

place each of the plurality of contacts in at least one of a first hold queue and a disconnected contact record queue coupled to the automated, computer controlled contact center system;

identify a connection status of each of the plurality of contacts in the at least a first hold queue;

store a contact record with the identified information and the connection status for each of the plurality of contacts;

receive a re-contact from a previous contact placed in at least said first hold queue by the automated, computer controlled contact center system;

compare the re-contact with the plurality of contacts in the hold queue;

match the re-contact with the identified information of a stored contact record; and identify a received contact-back communication from a user, wherein a match between the received contact and the contact record in one of the hold queue and the disconnected contact record queue changes the connection status of the contact record in the hold queue from a previous connection status to a connected status, and wherein the method next re-prioritizes the contact record associated with the re-contacting user in the disconnected contact record queue by prioritizing the received contact-back associated with the contact record with a higher priority level over any contact records not associated with the received contact-back record such that the received contact-back associated with the contact record is advanced in turn in said disconnected contact record queue.

12. The computer program product of claim 11, further comprising the computer program product being operable to cause the automated, computer controlled contact center system to:
display and prioritize the plurality of contact records located in the hold queue using a predetermined priority method.

13. The computer program product of claim 12, further comprising the computer program product being operable to cause the automated, computer controlled contact center system to:
connect one or more contact center agent terminals to the automated system for handling the connected contacts;
select a contact record using the predetermined priority method for connection to one of the one or more contact center agent terminals; and
connect the contact in the hold queue associated with the selected contact record to one of the one or more contact center agent terminals.

14. The computer program product of claim 11, further comprising the computer program product being operable to cause the automated, computer controlled contact center system to:
store a contact record in a disconnected queue when the selected contact record is associated with a contact record that has a disconnected connection status.

15. The computer program product of claim 14, further comprising the computer program product being operable to cause the automated, computer controlled contact center system to:
identify the connection status of each of the plurality of contacts as having a status of either connected or disconnected;
regularly review the status of each of the plurality of contacts;
maintain connected contacts in the hold queue and disconnected contacts in the disconnected queue; and
prioritize the contact records in the hold queue and the disconnected queue based on the predetermined priority method.

16. The computer program product of claim 11, wherein the re-contact is from a second telephone number than the stored contact, which is from a first telephone number.

17. The hold queue prioritizing method of claim 5, wherein said identified contact-back communication is based on at least one incoming re-contact request received from at least one contact by means of a second contact method different from a first contact method, for identifying a received contact-back based on matching the received re-contact request from said at least one contact identifying information with a contact record in one of the hold queue and the disconnected contact record queue.

18. The hold queue prioritizing method of claim 5, wherein said identified contact-back communication is based on identifying a received contact-back communication from a user based on a match between the user's received callback communication identified information and the identified information in a stored contact record for said user, and wherein a determination of a contact-back from a given user is effected by a different media type used by any given user in said contact-back communication to said automated system than the media type used by the user in the stored contact record to initially contact said automated system.

\* \* \* \* \*